May 3, 1927.
J. KURKOWSKI
1,627,288
APPARATUS FOR JOINING OR CONNECTING PIPES
Filed Feb. 2, 1922
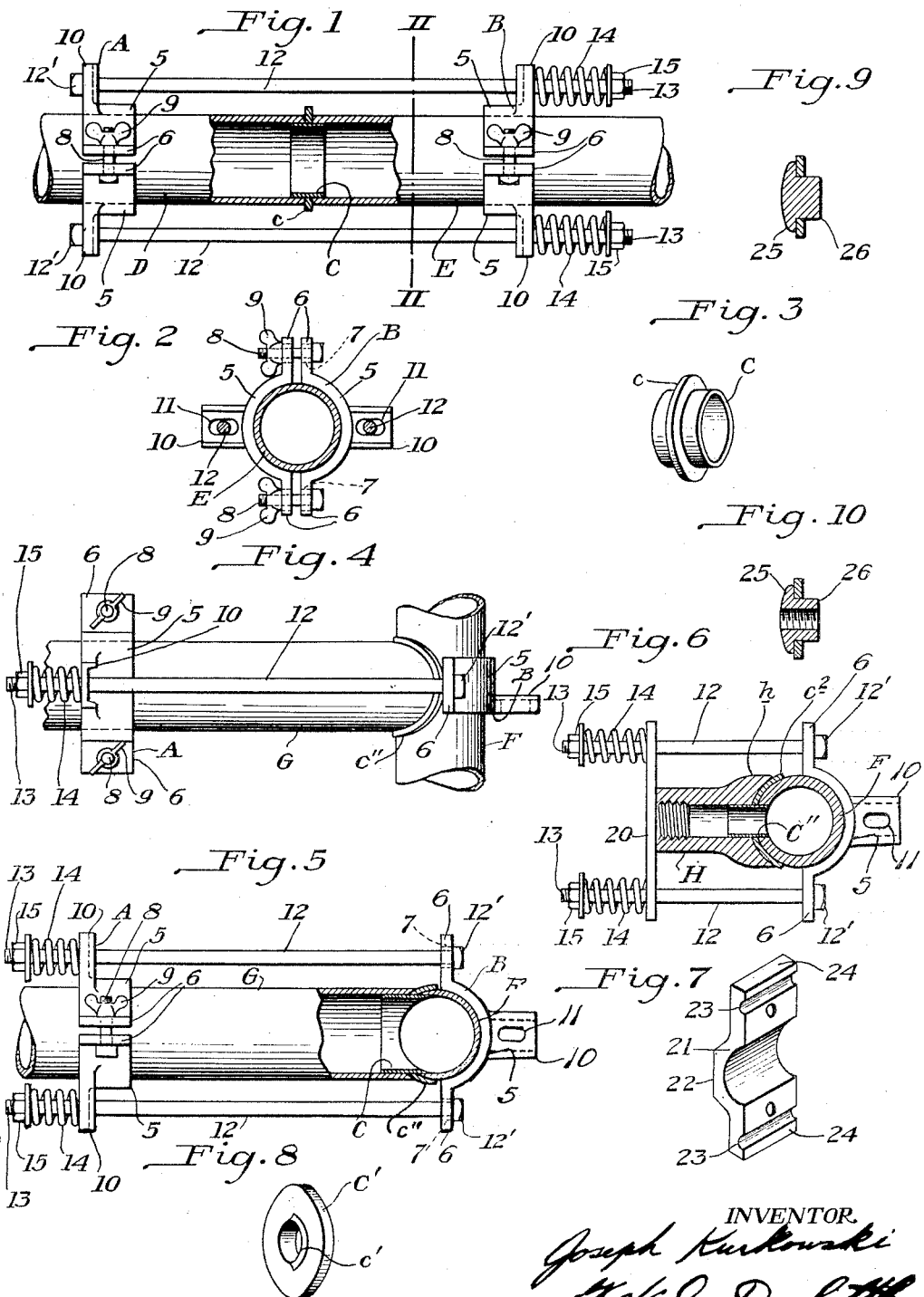

Patented May 3, 1927.

1,627,288

UNITED STATES PATENT OFFICE.

JOSEPH KURKOWSKI, OF PITTSBURGH, PENNSYLVANIA.

APPARATUS FOR JOINING OR CONNECTING PIPES.

Application filed February 2, 1922. Serial No. 533,612.

This invention is for a device to be used for joining or connecting pipes, and is particularly useful for joining lead pipes.

While the invention may be used by plumbers or other skilled workers, it is more especially designed as a tool for domestic use or use in small shops, so that a person not particularly skilled as a plumber may make repairs in pipes, or make extensions or taps at desired places in the house piping system without the aid and expense of a plumber. It might also readily be used by any person desiring to install or renew the water pipes in a house or other building. It is contemplated that the device be sold in a complete kit of tools and materials necessary for making minor repairs.

The invention has for its objects to provide a device for joining or connecting pipes which may be cheaply constructed and easily used by a layman, even in rather inaccessible places, and which will more or less positively insure of a good joint being made.

The invention may be readily understood by reference to the accompanying drawings, in which:

Fig. 1 is a side elevation showing my invention in use for joining abutting ends of pipe;

Fig. 2 is a transverse section on line II—II of Fig. 1;

Fig. 3 is a detail view of a coupling member which I may employ;

Fig. 4 shows another way in which the invention may be used for making a right angle joint;

Fig. 5 is a top view of the arrangement shown in Fig. 4, showing part of the pipe in section;

Fig. 6 shows another arrangement which may be used where a spigot is to be joined to a pipe;

Fig. 7 is a perspective view of a slightly modified form of clamp;

Fig. 8 is a perspective view of a modification which may be substituted for the device shown in Fig. 3;

Figs. 9 and 10 show detail views of some other devices which may be used in connection with my invention.

The complete device includes a pair of clamps A and a pair of clamps B. As shown in Figs. 1 and 2, each clamp is formed of two curved substantially semi-circular clamping members 5 having flat extensions 6 thereon in which are openings, preferably slots, at 7. The clamps are adapted to be placed together, and a bolt 8 is adapted to be passed through registering openings 7 of the extensions. A wing nut 9, or any other suitable nut, is threaded onto each bolt 8. Each clamp member has a concaved pipe engaging surface, and these surfaces are preferably roughened or knurled to more effectively grip the pipe. This is shown in Fig. 7.

Projecting from the outside of each clamp member 5 is an apertured extension or an integral lug 10 having a hole or slot 11 therethrough. Rods 12 each having a head 12' and a threaded end 13 are designed to extend through these lugs when the clamps are applied. Compression springs 14 are placed around the rods and a nut 15 is screwed onto end 13.

C represents a brass sleeve and $c$ is a fusible washer of solder or other suitable material.

The device is used in a number of different ways. Assume, first, that a lead water pipe has burst. The pipe is cut in two at the rupture and the ends are smoothed off and, if desired, the pipes may be counter bored to a slight distance by a suitable facing and reaming tool, not shown. The brass sleeve C, which has an inside diameter equal to the inside diameter of the pipe when the pipe is counter-bored, or an outside diameter equal to the inside diameter of the pipe when the pipe is not counter-bored, is inserted in the two ends, with the fusible washer $c$ between the opposed faces of the pipe. In Fig. 1, D and E represent the two sections of pipe. Instead of being ends of pipe to be repaired, they may, of course, represent any two sections of pipe to be joined.

Clamp A is then applied to section D at a suitable distance from the end, and clamp B is applied to section E. The wing nuts 9 are then turned to immovably clamp the pairs of clamps to the respective pipe sections. They are clamped after rods 12 are inserted through the openings in lugs 10, so that the lugs will be as nearly in alinement as possible. After each pair of clamps has been set, springs 14 are applied to the projecting ends and nuts 15 are screwed up to place the springs under considerable pressure.

With the device thus applied, a blow torch, gas burner, or other suitable flame or source of heat may be applied to washer c to melt it. As the washer melts, springs 14 will tend to force the ends of the pipes toward each other so that they will be securely joined, when the solder cools. Sleeve C merely tends to keep the pipe ends in proper alinement.

In some instances the sleeve C may be omitted and a fusible washer C' provided with flanges c employed in place thereof, see Figure 8.

The clamp structure is relatively small and compact so that it may be used close to a wall or floor. The compression springs need only be relatively short and, being located outside of the space between the clamps, will not be subjected to heat when making the joint. The whole operation is simple and may be easily done with little or no experience, and the joint is as serviceable as a "wiped" one. Various sizes of pipes may be clamped.

When joining one pipe at right angles to another, the device is used as shown in Fig. 4. In this view, F indicates a pipe and G a branch secured thereto. To make this joint, pipe F is tapped and then a suitable brass nipple or sleeve C inserted with a curved washer c." Clamp A is applied to the pipe G in the manner shown and hereinbefore described. However, only one part of clamp B is used and the rods 12 are passed through openings 7 in place of bolts 8. The joint is then made by heating washer c".

When, instead of putting a branch G on pipe F, it is desired to have a faucet or spigot, the operation is effected in a slightly different manner because the spigot will be close to the pipe F. An arrangement for applying a spigot is shown in Fig. 6.

H is a special connecting member having a flat interiorly threaded outer end into which a spigot may be screwed and an enlarged interior end h shaped to conform to pipe F. In the inner end is a non-fusible nipple C". A fusible washer $c^2$ is placed between portion h and pipe F after the latter has been tapped and when member H is applied. One curved clamp member 5 is applied to pipe F but a flat strip 20 may be placed across the end of member H and rod 12 may pass through this member. The joint is then made in the manner hereinbefore described.

Instead of using a flat member 20, the clamps may be formed as shown in Fig. 7, in which 21 indicates a clamp member corresponding to 5, but having a flattened face at 22 so that this face may be held against the end of member H in place of member 20. The clamp may be further modified to omit lugs 10 and provide a semi-circular recess 23 in extensions 24 in which rods 12 may be received. This enables a joint to be made where the space is exceedingly limited. This form of clamp is not, however, as convenient to handle under ordinary circumstances as the clamps shown in Fig. 1.

In Fig. 9 I have shown a plug which can be applied with the use of my invention for closing the open end of a pipe. The plug may have a head 25 and a shank 26. The plug might, if desired, be tapped and threaded as shown in Fig. 10, to form a connection for threading in a metal pipe of reduced diameter.

Various other changes and modifications are contemplated by my invention and within the scope of the appended claims.

What I claim is:

1. A portable device to be used in making pipe connections comprising a pair of opposed pipe engaging members having intermediate apertured extensions and apertured terminals thereon for the reception of rods, removable means for detachably and adjustably holding and drawing the members together, rods passing through said extensions, the rods being receivable in either the terminals of the said members or in the said extensions to enable the device to be arranged for holding two pipes in alinement or two pipes at right angles to each other, and compression springs carried by the rods and interposed between one of said pipe engaging members and one end of the rod.

2. A portable device to be used in making pipe connections comprising a pair of opposed semi-cylindrical pipe engaging members having intermediate apertured extensions and apertured terminals thereon for the reception of rods, rods passing through said extensions, the rods being receivable in either the terminals of the said members or in the said extensions to enable the device to be arranged for holding two pipes in alinement or two pipes at right angles to each other, compression springs carried by the rods and interposed between the extensions of one of said pipe engaging members and one end of the rod, and means for varying the compression on said springs.

3. A portable device to be used in making pipe connections comprising a pair of pipe engaging clamps, each clamp comprising two members having concaved pipe engaging surfaces, bolts at each side of said member for securing them together in clamping relation with a pipe, rods connecting said clamps, one of the clamps being slidable on the rods, said rods being also receivable in the ends of the said members to enable the rods to be arranged for holding two pipes in alinement or at right angles to each other, and a compression spring on each of the rods adjacent one end thereof and engaging one of the clamps, and means whereby the springs may be held under compression, said springs being adapted to urge said clamps toward each other.

4. A portable device to be used in making pipe connections comprising a pair of pipe engaging clamps, each clamp comprising two members having concaved pipe engaging surfaces and apertured terminals, bolts at each side of said member for securing them together in clamping relation with a pipe, a lug formed on and projecting from each clamp member and having an opening therethrough, a pair of rods for connecting said clamps, said rods being adapted to pass through the openings in said lugs and being receivable in the lugs or the terminals of the members to enable the device to be arranged for holding two pipes in alinement or at right angles, a head at one end of each rod, a nut threaded on the other end thereof, and a spring on each rod interposed between the one end of the rods and the adjacent clamp member for urging the clamps toward each other.

5. A device to be used in making pipe joints comprising a pair of clamps composed of clamping members having concave pipe engaging faces and extended terminals said members being also provided between the terminals with lugs, the terminals and the lugs having openings, bolts arranged in the openings of the terminals for drawing the clamp members into engagement with the pipe, and rods arranged in the openings of the lugs and connecting the clamps, said rods being receivable in either the lugs or the extensions of the members to enable the device to be arranged for holding two pipes in alinement or at right angles to each other.

In testimony whereof I affix my signature.

JOSEPH KURKOWSKI.